United States Patent [19]

Hamane et al.

[11] Patent Number: 4,457,067
[45] Date of Patent: Jul. 3, 1984

[54] COIL INSERTING APPARATUS

[75] Inventors: Tokuhito Hamane; Masaaki Tasai, both of Hirakata, Japan

[73] Assignee: Matsushita Electric Industrial Co., Ltd., Kadoma, Japan

[21] Appl. No.: 370,550

[22] Filed: Apr. 21, 1982

[30] Foreign Application Priority Data

Apr. 21, 1981 [JP] Japan .................. 56-61078

[51] Int. Cl.³ ............................................ H02K 15/06
[52] U.S. Cl. ......................................... 29/736; 29/596
[58] Field of Search ................ 29/736, 732, 734, 596, 29/606

[56] References Cited

U.S. PATENT DOCUMENTS

| | | |
|---|---|---|
| 3,791,419 | 2/1974 | Arick et al. . |
| 3,829,953 | 8/1974 | Lauer et al. . |
| 4,186,478 | 2/1980 | Hamane et al. . |
| 4,383,360 | 5/1983 | Hamane et al. ................. 29/736 |

FOREIGN PATENT DOCUMENTS

| | | |
|---|---|---|
| 2358045 | 2/1978 | France . |
| 56-112860 | 9/1981 | Japan . |
| 56-112861 | 9/1981 | Japan . |
| 1563648 | 3/1980 | United Kingdom . |

OTHER PUBLICATIONS

European Search Report, European Patent Application No. 82 10 3292, search completed July 8, 1982.

*Primary Examiner*—Carl E. Hall
*Attorney, Agent, or Firm*—Wenderoth, Lind & Ponack

[57] ABSTRACT

An apparatus reduces the insertion-required force in a coil inserting apparatus. A coil and an insulating material piece are automatically inserted into the groove of a stator core by the operation of a coil pusher. A current flows from a piezo-electric element accommodated within the coil pusher, when insertion resistance applied upon the coil pusher has increased, through the relay solenoid valve to drive a hydraulic cylinder thereby raising the coil wrapping jig. When the insertion pressure has suddenly increased, the current stops to keep fundamentally the coil wrapping jig synchronous to the motion of the coil pusher.

3 Claims, 5 Drawing Figures

COIL INSERTING APPARATUS

BACKGROUND OF THE INVENTION

1. Field of the Invention

The present invention relates to an apparatus for manufacturing the stators of electric machines including a core and a coil to be inserted into the core. More particularly, the present invention provides a coil inserting apparatus, wherein a coil and an insulating material piece are automatically inserted into the groove of the stator core while reducing the insertion-required force thereof.

2. Description of the Prior Art

Conventionally, a method of reducing the resistance caused in the insertion of the coil into the groove of the stator core so as to prevent the coil from being injured, hit, expanded or the like, or so as to prevent the stator core from being deformed was already described in, for example, Japanese Patent Laid Open Publication No. 78001/1978. Such a coil inserting apparatus referred to above was proposed, for example, in Japanese Patent Laid Open Publication No. 14141/1980.

In the preceding application, there was provided a coil inserting apparatus comprising a coil inserting jig for accommodating a coil, a coil push rod for inserting a coil, accommodated in the coil inserting jig, an apparatus for retaining a core to be supplied to the upper end portion of the coil inserting jig, a coil lifting apparatus composed of a coil wrapping jig disposed near the outer periphery of the coil inserting jig and adapted to wrap the coil being inserted, means for driving the coil wrapping jig, and means for synchronizing this coil lifting apparatus with the coil push rod to raise the coil lifting apparatus. However, such a coil inserting apparatus had not reduced the force required for insertion of the coil.

SUMMARY OF THE INVENTION

Accordingly, an object of the present invention is to provide an improvement of such a coil inserting apparatus as described in Japanese Patent Laid Open Publication No. 14141/1980 for considerably reducing the force for inserting the coil into the core.

Another object of the present invention is to provide a coil inserting apparatus of the type referred to above which is simple in construction, accurate in function and economic in operation and which can operate automatically to produce stators including a coil inserted into a core smoothly without any trouble.

According to the present invention, there is provided a coil inserting apparatus comprising a coil inserting jig for accommodating a coil therein and for retaining the coil thereto, a coil pusher for inserting into a core the coil accommodated in said coil inserting jig, a coil lifting apparatus composed of a coil wrapping jig, adapted to hold down the coil provided around the coil inserting jig or to lift up the coil to insert into a core, and means for driving said coil wrapping jig supporting the coil in response to a force applied upon said coil pusher to hold down or lift up the coil, thereby reducing the resistance force caused during the coil insertion.

As a more preferred embodiment, said driving means includes a piezo-electric element built-in within the coil pusher for receiving a force proportional to a force applied upon the coil pusher, and a hydraulic cylinder actuated by means of the piezo-electric element for driving the coil wrapping jig. A current flows from the piezo-electric element, when insertion resistance applied upon a coil pusher has increased, through the relay solenoid valve to drive a hydraulic cylinder thereby to raise the coil wrapping jig, while, when the insertion pressure has suddenly increased, the current stops to fundamentally keep the coil wrapping jig synchronous to the motion of the coil pusher for reducing the insertion-required force by which the coil and insulating material piece are automatically inserted into the groove of the core.

These objects and other objects, features, aspects and advantages of the present invention will become more apparent from the following detailed description of the present invention when taken in conjunction with the accompanying drawings.

BRIEF DESCRIPTION OF THE DRAWINGS

Before the description of the present invention proceeds, it is to be noted that like parts are designated by like reference numerals throughout the views of the accompanying drawings.

DETAILED DESCRIPTION OF THE INVENTION

Figure 1:
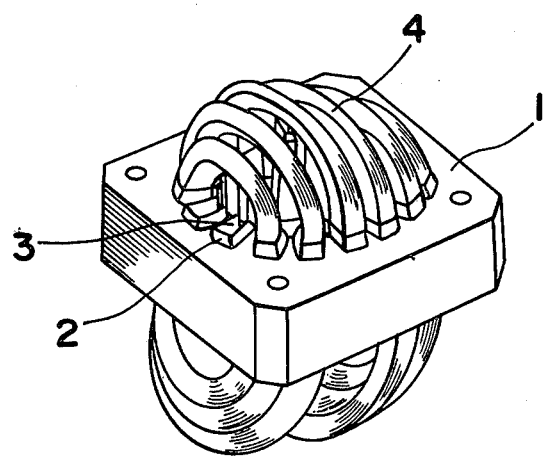
FIG. 1 is a perspective view of a stator of an electric machine which is manufactured by a coil inserting apparatus of the present invention.
Figure 2:
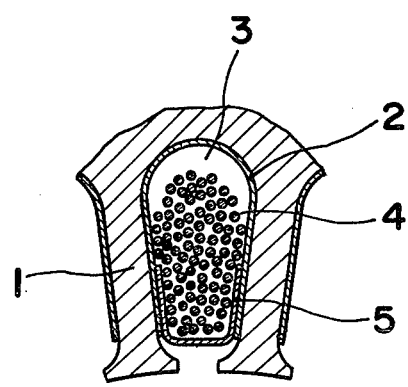
FIG. 2 is a cross-sectional view, on an enlarged scale, of the groove of the stator of FIG. 1.

Referring now to the drawings, there is shown in FIGS. 1 and 2 a stator of an electric machine according to one preferred embodiment of the present invention which is generally composed in a condition where, within a stator core 1 having a plurality of grooves 3, a coil 4 and an insulating material piece 5 are inserted into the groove 3 insulated by an insulating paper 2 of the stator core 1.

Figure 3:
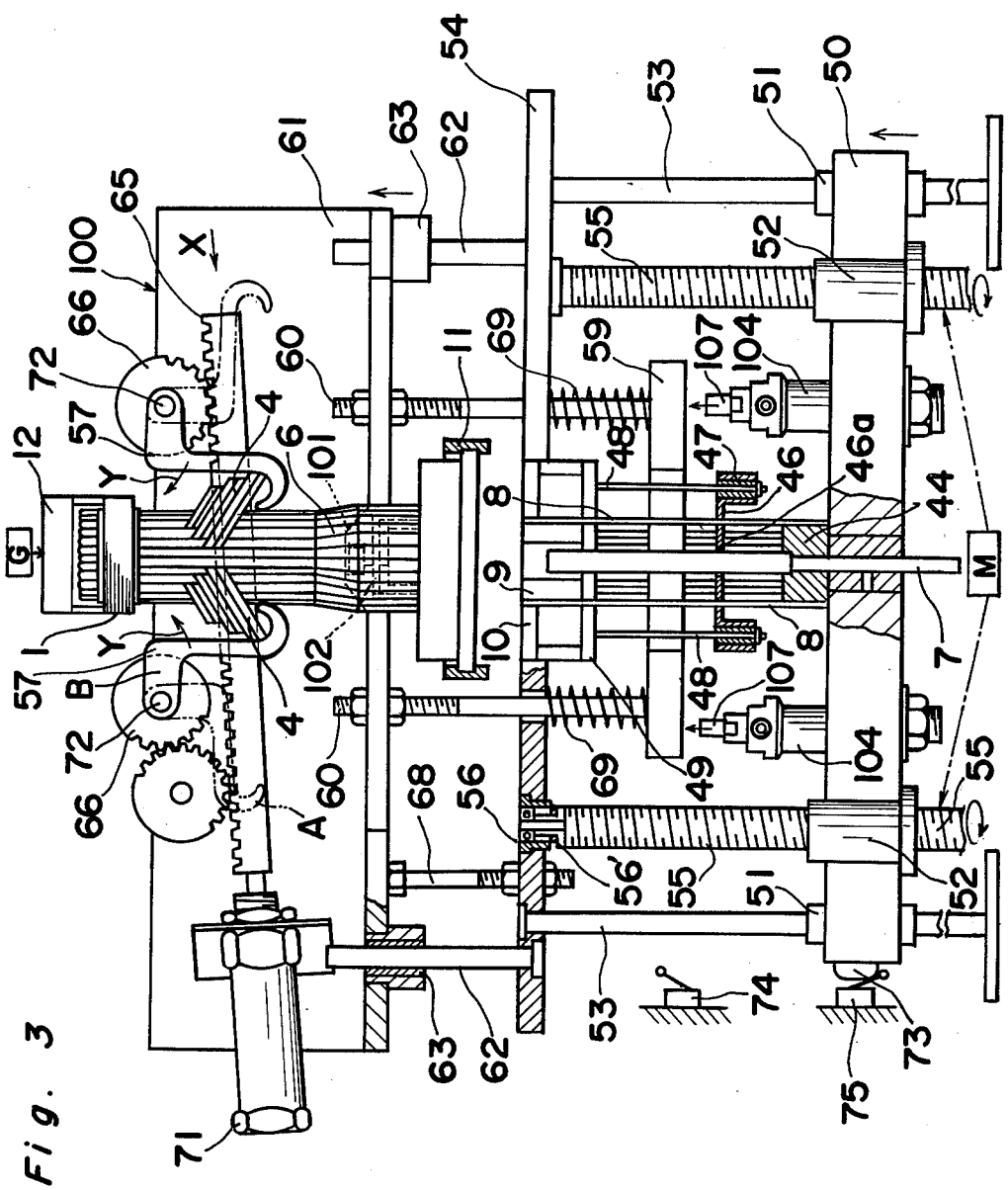
FIG. 3 is a partially sectional front-face view of a coil inserting apparatus in one embodiment of the present invention.
Figure 4:
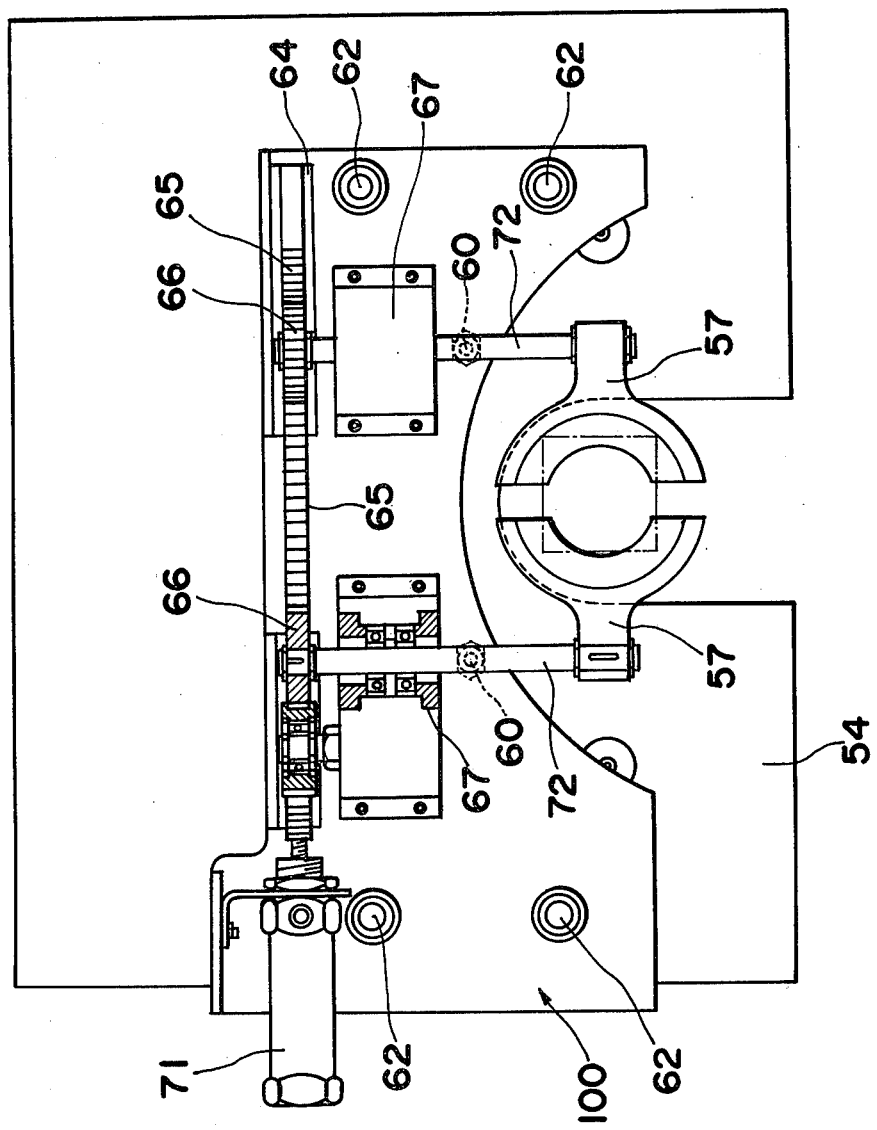
FIG. 4 is a plan view of the apparatus on FIG. 3.
Figure 5:
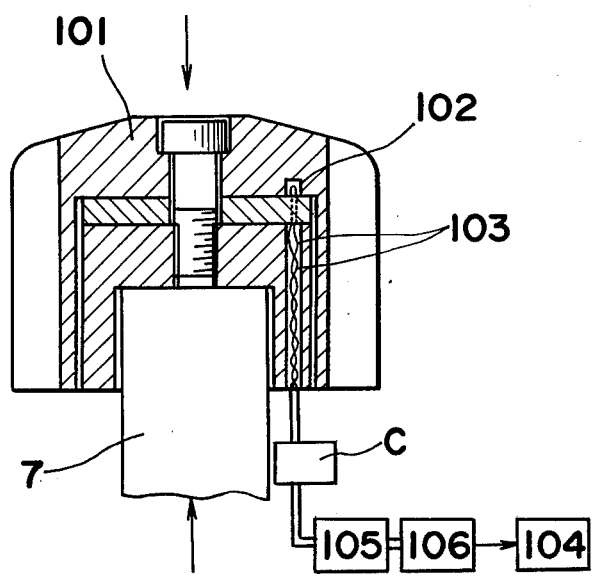
FIG. 5 is a schematic construction view, on an enlarged scale, including a cross-sectional view of a coil pusher in one embodiment of the present invention.

FIGS. 3 to 5 show a coil inserting apparatus for inserting automatically the coil 4 and insulating material piece 5 into the groove 3 of the stator core 1 on the application of a small insertion force. The apparatus comprises a coil inserting jig 6 for accommodating the coil 4 and retaining the coil 4, a coil pusher 101 for inserting into the core 1 the coil 4 accommodated in said coil inserting jig 6, a coil lifting apparatus composed of a coil wrapping jig 57 adapted to hold down the coil 4 provided around the coil inserting jig 6 or to lift up the coil 4 to insert into the stator core 1, and means for driving the coil wrapping jig 57 supporting the coil 4 in response to a force applied upon the coil pusher 101 to hold down or lift up the coil during the coil insertion.

As shown in FIG. 3, the coil inserting jig 6 is always positioned in alignment with the coil 4 to be inserted into the grooves 3 of the stator core 1, and a coil push rod 7 is applied to move vertically to engage with and push up the coil pusher 101, as shown in FIGS. 3 and 5, provided within the coil inserting jig 6 in order to insert the coil 4 into the grooves 3 of the stator core 1 in a known manner, as disclosed in U.S. Pat. No. 4,186,478 of the same applicant granted on Feb. 5, 1980. Also, an insulating material piece moving-body 8 is used to insert an insulating material piece 5 (not shown in FIG. 3), accommodated within the coil inserting jig 6, into the groove 3 of the stator core 1. A housing 9 is secured on a flange 10 provided at the center of a base plate 54 fixed at a position to support slidably the coil push rod 7 and the insulating material piece moving-body 8 therethrough. A positioning apparatus 11, provided at a fixed position for guiding the coil inserting jig 6, matches above the housing 9 with the lower portion of the coil inserting jig 6, while a cap plate 12 for pressing downwardly with a constant force by means of a pressure governor G (shown only schematically in FIG. 3) comes into contact against the upper surface of the stator core 1 engaging with the coil inserting jig 6. In addition, a retaining plate 44 has a groove for setting the under portion of the insulating material piece moving-body 8 at equal intervals along the peripheral direction to secure the insulating material piece moving-body 8. The coil push rod 7 is secured axially to the center of the retaining plate 44 which is secured on a push moving body 50, in a known manner. The coil push rod 7 is provided, at its tip end, with a flat portion for engagement and disengagement of the coil pusher 101. A guide moving body 46 has a plurality of holes for guiding the middle portion of the insulating material moving-body 8, and has a hole 46a at its center for passing through the coil push rod 7 and two holes at both sides in parallel to the hole 46a, the hole 46a being larger than the coil push rod 7 and the two holes having a slide bearing 47 internally engaged. A guide shaft 48 is slidable provided within the slide bearing 47 and is secured, at its tip end, to a support plate 49 which is secured on the base plate 54 under the housing 9.

The push moving body 50 provided with the retaining plate 44 secures a pair of slide bearings 51 respectively right and left in its axial direction, and also has a pair of ball screw bearings 52 having threads therein secured respectively right and left close to and in parallel to the slide bearings 51. A shaft 53 is secured at its both ends to the base plate 54 and an plate fixed underneath (not shown). The shaft 53 is adapted to guide the slide bearing 51 thereon, which is internal contact between the push moving body 50 and the shaft 53. Also, a ball screw shaft 55 having threads thereon is adapted to mesh with the ball screw bearings 52 to move it up and down together with the push moving body 50. Both ends of the ball screw shaft 55 are rotatably mounted through bearings 56, 56' and bearings (not shown), respectively on the base plate 54 and on the plate fixed underneath (not shown). The output shaft (not shown) of a motor M provided under the push moving body 50 is coupled to the ball screw shaft 55 by a chain sprocket, shown only schematically in FIG. 3, so that the ball screw shaft 55 is driven in rotation by the motor M to move the ball screw bearing 52 up and down.

A hydraulic cylinder 71 is provided on a movable plate 61 disposed over the base plate 54 and has its rod coupled to a rack 65 to be guided with a support 64 (FIG. 4 only) provided on the movable plate 54. A gear 66, to be interlocked with the rack 65, is coupled to a coil wrapping jig 57 of the type referred to, then to a normal coil shaping jig for reduction of the coil insertion resistance by the shaft 72 which is supported on a bearing housing 67 provided on the movable plate 54. The bearing housing 67 supports rotatably the shaft 72 of the gear 66 and the coil wrapping jig 57. A coil lifting apparatus 100 is composed of the hydraulic cylinder 71, rack 65, gear 66, bearing housing 67, support 64, and coil wrapping jig 57. By the actuation of the hydraulic cylinder 71, the rack 65 moves along the support 64 to rotate the gear 66 together with the coil wrapping jig 57 in the clockwise and counterclockwise directions. A screw shaft 60 varies the interval between the movable plate 61 and a pushing plate 59 to couple them at a given distance. A shaft 62 is fixedly mounted on the base plate 54 and is slidably guided by the slide bearing 63, which is internally engaged with the movable plate 61. Also, a stopper 68 is fixedly mounted on the base plate 54 to provide a stopper for the movable plate 61 to prevent it from moving downwards. A compression spring 69 is provided between the base plate 54 and the pushing plate 59 to push downwardly the pushing plate 59 to a cylinder 104 provided on the push moving body 50. A pair of microswitches 74 and 75 for actuating the cylinder 104 are provided at certain positions near the push moving body 50 and a dog 73 provided on the push moving body 50 is adapted to kick the microswitches 74 and 75 during the movement of the push moving body 50. The cylinder 104 is actuated by its rod 107 to push upwards the pushing plate 59 against the compression spring 69.

Referring to FIG. 5, a piezo-electric element 102 is provided built-in within the coil pusher 101 for receiving a force proportional to a force the coil pusher 101 receives from the push moving body 50 to be moved upwardly by the actuation of the motor M. A lead wire 103 is connected to the piezo-electric element 102 and the terminal thereof is connected in series to a relay 105 and a controller unit C of the relay 105 inserted halfway along the lead wire 103. A current for the lead wire 103 may flow only when a force applied upon the piezo-electric element 102 increases up to a certain amount. The lead wire 103 of the relay 105 is further connected to a solenoid valve 106 which is adapted to control the operation of the hydraulic cylinder 104.

The operation of the coil inserting apparatus construed as above mentioned will be described hereinafter.

Once a coil inserting jig 6 which supports the coil 4 is carried to the apparatus, adjusted in position, and is locked at a certain location by the positioning apparatus 11 shown in FIG. 3, the motor M is operated by means of the microswitch 75, and the ball screw shaft 55 is rotated to raise the push moving body 50 upward along the shaft 53. Thus, the coil push rod 7 secured to the push moving body 50 is raised upwardly together with the insulating material moving-body 8 to engage with the coil pusher 101 located within the coil inserting jig 6, and the coil pusher 101 is coupled to the coil push rod 7 to raise together, as shown in FIG. 5. In addition, once the coil pusher 101 rises to a given height, the dog 73 of the push moving body 50 actuates a microswitch 74 to operate the hydraulic cylinder 71, and the piston of the hydraulic cylinder 71 moves together with the rack 65 along the support 64 in a direction shown in an arrow X of FIG. 3 to rotate the gear 66 in a direction of arrow Y. Therefore, the coil wrapping jig 57 pivots with the rotation of the gear 66 from a position A to a position B through the shaft 72 in the arrow direction Y of FIG. 3, thereby to slightly raise the coil 4 upward. In this position, the cylinder rod 107 of the cylinder 104 is adjusted to be located immediately before coming into contact against the underside of the pushing plate 59, and the movable plate 61 is located on the stopper 68 at the lowest position by means of the compression spring 69.

Once the push moving body 50 raises up some more, the pushing plate 59 is going to move and rise through the pushing of the cylinder rod 107, whereby the movable plate 61 is rendered to rise upward against the compression spring 69, which is coupled to the pushing plate 59 through the screw shaft 60.

The coil pusher 101 which is inserting the coil 4 into the stator core 1 at this time receives the downward insertion resistance by the coil 4, and the piezo-electric element 102 built-in within the coil pusher 101 receives a force proportional to a force applied upon the coil pusher 101. If a force applied upon the coil pusher 101 abruptly increases, a current of the piezo-electric element 102 flows to a lead wire 103 to operate a relay 105, thereby opening a solenoid valve 106 to control the operation of the hydraulic cylinder 104. Accordingly, the hydraulic cylinder 104 is actuated to further raise the plates 59 and 61 from the lower position to the upper position against the compression spring 69, and, thus, the coil 4 is further raised up by the coil wrapping jig 57 provided on the movable plate 61. Therefore, in a case where the locking condition between the coil 4 and the coil insertion jig 6 is removed by the upward movement of the coil wrapping jig 57, and the resistance force applied upon the coil pusher 101 and the piezo-electric element 102 becomes small, a current flowing through the lead wire 103 stops, the contact of the relay 105 is separated, a solenoid valve 106 is closed to stop the operation of the hydraulic cylinder 104, and the coil wrapping jig 57 raises to hold down the coil 4 at the same speed as that of the coil pusher 101 which is moved upwardly by the operation of the motor M together with the coil push rod 7 and the push moving body 50.

If a force applied upon the coil pusher 101 further increases, a current keeps flowing to the lead wire 103 to close the contact of the relay 105 to open the solenoid valve 106, thereby actuating the operation of the hydraulic cylinder 104. Accordingly, the plate 59 is further raised by the rod 107 of the hydraulic cylinder 104 to further raise the coil 4 by the coil wrapping jig 57.

The insertion of the stator coil 4 into the core 1 is completed through the repetition of the above operation, and the motor M is automatically stopped by the detection of the completion thereof. With the above explanation of the present embodiment, it is to be noted that a current flows from the piezo-electric element 102 provided within the coil pusher 101, when insertion resistance applied upon the coil pusher 101 has increased to drive the hydraulic cylinder 104 through the relay 105 and the solenoid valve 106 thereby raising the coil wrapping jig 57, while, when the insertion pressure has suddenly increased, the current reduces to stop the operation of the hydraulic cylinder 104, thereby to fundamentally keep the coil wrapping jig 57 synchronous to the motion of the coil pusher 101. Accordingly, the insertion pressure for the coil 4 into the stator core 1 can be effectively reduced, during the raising of the coil wrapping jig 57, through the synchronous relation of the coil wrapping jig 57 with the receiving force of the coil pusher 101, so that trouble during the insertion of the coil 4 into the stator core 1 may be prevented from being caused or the stator core 1 may be prevented from being deformed.

Although the present invention has been fully described by way of examples with reference to the accompanying drawings, it is to be noted that various changes and modifications will be apparent to those skilled in the art. For instance, in the present embodiment, the coil wrapping jig 57 was used as a coil shaping jig for reduction of the coil insertion resistance. Needless to say, such a coil controlling means from the flank, as shown in Japanese Patent Laid Open Publication No. 78001/1978, can be used in place of the coil wrapping jig 57. Therefore, unless such changes and modifications depart from the scope of the present invention, they should be construed as included therein.

What is claimed is:

1. An apparatus for inserting a coil into a stator core, comprising:
    a coil inserting jig means for accommodating and retaining the coil therein,
    a coil pusher means for inserting into the stator core the coil accommodated in said coil inserting jig means,
    a coil lifting apparatus composed of a coil wrapping jig means for holding down the coil provided around the coil inserting jig means and for lifting up the coil to insert into the stator core, and
    means for driving the coil wrapping jig means supporting the coil in response to a force applied upon the coil pusher means to hold down or to lift up the coil,
    whereby resistance force caused during the coil insertion is reduced.

2. A coil inserting apparatus as defined in claim 1, wherein said driving means includes a piezo-electric means, built into the coil pusher means, for receiving a force proportional to a force applied upon the coil pusher means.

3. A coil inserting apparatus as defined in claim 1, wherein said driving means further includes a hydraulic cylinder means, actuated by the piezo-electric means, for driving the coil wrapping jig means.

* * * * *